United States Patent [19]

Dairon

[11] Patent Number: 5,236,050
[45] Date of Patent: Aug. 17, 1993

[54] ROTARY SOIL AGITATOR WITH AUTOMATIC DISTRIBUTION OF THE DRIVE TORQUE AT EACH END

[75] Inventor: Michel Dairon, Le Grand Luce, France

[73] Assignee: Societe Anonyme DAIRON, France

[21] Appl. No.: 486,283

[22] Filed: Feb. 28, 1990

[30] Foreign Application Priority Data

Mar. 3, 1989 [FR] France ............................ 89 03004

[51] Int. Cl.⁵ ............................................ A01B 33/02
[52] U.S. Cl. .................................. 172/103; 172/263; 172/540
[58] Field of Search ............... 172/103, 568, 567, 104, 172/119, 125, 112, 535, 117, 123, 566, 35; 177/263, 540

[56] References Cited

U.S. PATENT DOCUMENTS

| | | | |
|---|---|---|---|
| 2,051,694 | 8/1936 | Fishleigh | 172/125 |
| 2,888,994 | 6/1959 | Hoff et al. | 172/103 |
| 2,908,337 | 10/1959 | Surprise | 172/125 |
| 3,892,278 | 7/1975 | Smith et al. | 172/119 |
| 4,044,841 | 8/1977 | Smith et al. | 172/112 X |
| 4,420,048 | 12/1983 | Peterson | 172/568 |

Primary Examiner—Stuart S. Levy
Assistant Examiner—Joseph A. Rhoa
Attorney, Agent, or Firm—Roylance, Abrams, Beredo & Goodman

[57] ABSTRACT

A rotary mixer is disclosed with automatic distribution of the drive torque at each end, wherein the power transmission at each end of the rotor is provided by at least one chain driving a pinion coaxial with the rotor, a torque limiter being interposed between the latter and said pinion and each of the two torque limiters being set to the same torque limit value such that the sum of the two values is slightly greater than the nominal drive torque of the rotor.

12 Claims, 3 Drawing Sheets

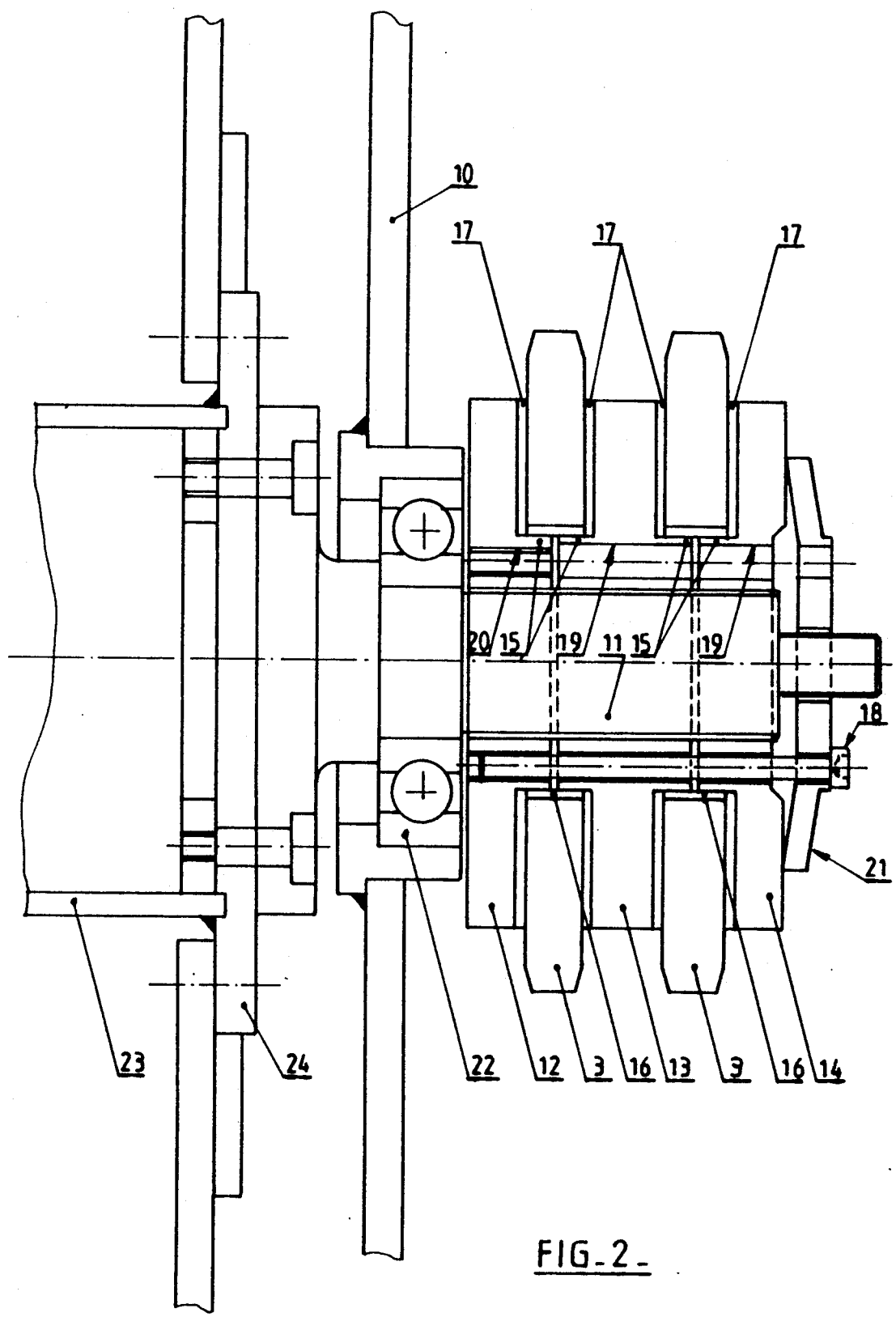
FIG-2-

ROTARY SOIL AGITATOR WITH AUTOMATIC DISTRIBUTION OF THE DRIVE TORQUE AT EACH END

BACKGROUND OF THE INVENTION

The present invention relates to a rotary mixer, namely a machine for working the soil and more precisely for breaking up the soil by means of a semi-mounted rotor with horizontal axis transversal to the advancing direction of the tractor, said rotor being driven in the opposite direction to that of the wheels of said tractor and having a number of disks with blades or picks for breaking up the ground over a few tens of centimeters.

Such machines are generally sorely tested and, because of the very considerable resistive forces often experienced during use and because of the defects or lack of balancing of the drive forces exerted at both ends of the rotor, the transmission sometimes breaks or is damaged to a greater or lesser degree.

The purpose of the invention is precisely to overcome these drawbacks by providing means ensuring balanced and automatic distribution of the drive forces at both ends of the rotor.

SUMMARY OF THE INVENTION

The invention has then as object a rotary mixer with automatic distribution of the drive torque at each end, characterized in that the power transmission at each end of the rotor is provided by at least one chain driving a pinion coaxial with the rotor, a torque limiter being inserted between the latter and said pinion and each of the two torque limiters being set to the same torque limit value such that the sum of the two values is slightly greater than the nominal torque required for driving the rotor.

Such a device provides both automatic and balanced distribution of the drive forces at both ends of the rotor, thus making maximum use of the driving power delivered by the tractor and sparing as much as possible the transmission of the mixer.

The invention also provides an adaptable rotor and more precisely a rotor designed particularly for rapid and ready modification of the working width.

For this, the rotor is provided with blade-carrying disks fixed removably on collars fast with a tube forming the shaft of the rotor, said collars being identical, having an external indented contour and being obtained by cutting out the annular internal portion of each disk.

Such a mounting system makes it possible, very easily and rapidly, to fit with disks the desired number of collars of the tube shaft, the disks being fitted on to said tube and passing without difficulty over any collar, by presenting them suitably, because of the complementary shapes between the external indented contour of the collars and the internal indented contour of the disks. To fix a disk on a collar, it is sufficient to shift the disk angularly so as to cause the solid portions of said indented contours to be superimposed then to secure said solid portions together, for example by screwing.

BRIEF DESCRIPTION OF THE DRAWINGS

Other features and advantages will be clear from the following description of an embodiment of the device of the invention, which description is given solely by way of example with reference to the accompanying drawings in which:

FIG. 2 is an axial sectional view in detail of one of the ends of the rotor of FIG. 1;

DESCRIPTION OF THE PREFERRED EMBODIMENT

Figure 1:
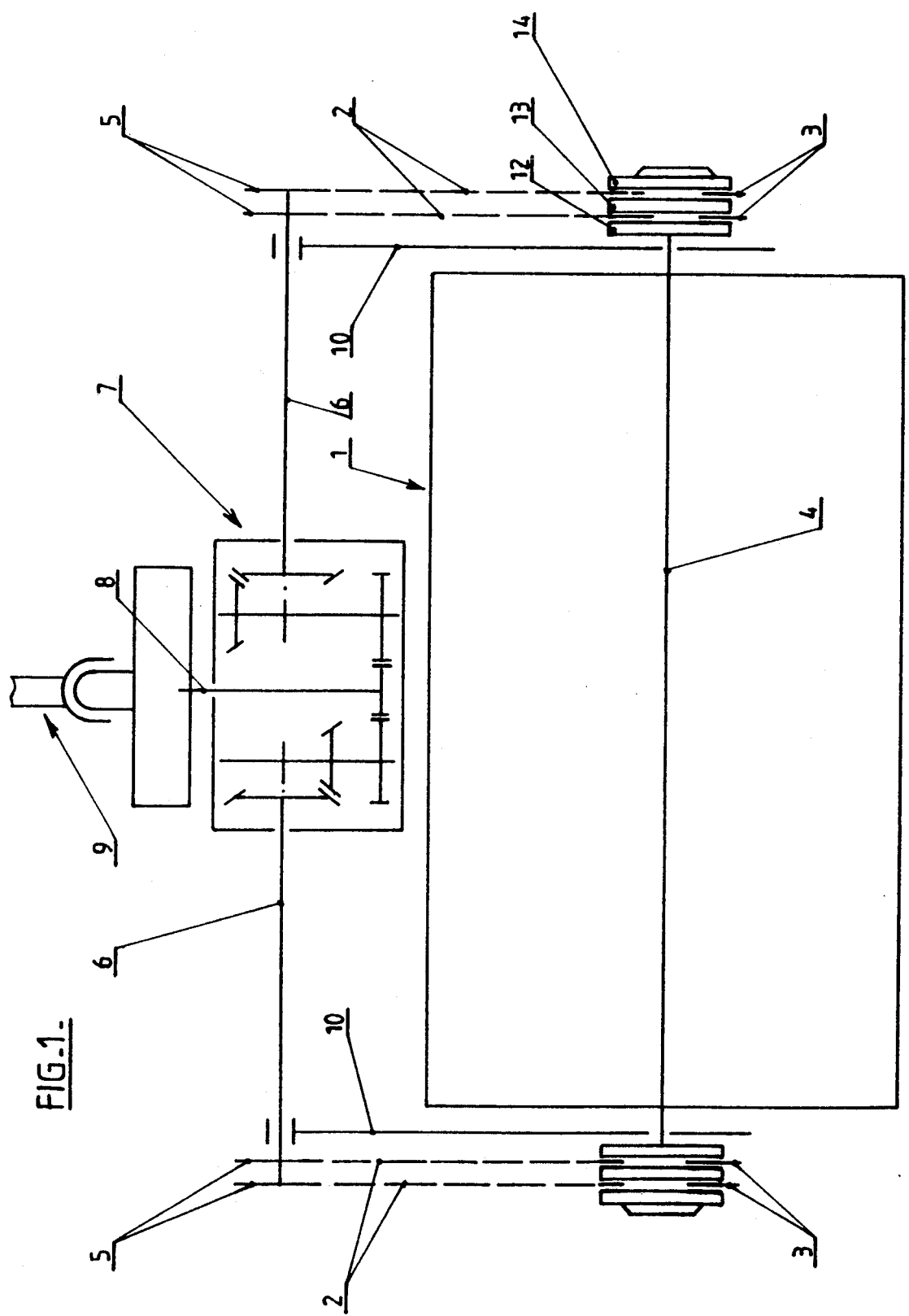
FIG. 1 is a top schematic view of a driven rotor in accordance with the invention.

FIG. 1 shows schematically a top view of a mixer rotor 1 driven at both ends by a transmission comprising two chains 2 engaged both with pinions 3 coaxial with shaft 4 of rotor 1 and with pinions 5 fast with a counter-shaft 6.

The two shafts 6 are parallel to shaft 4, coaxial and disposed on each side of a double counter-motion box 7 comprising an input shaft 8 driven from the power take-off of a tractor through a universal joint transmission, in a way known per se.

Shaft 4 is held by two lateral arms 10 articulated to shafts 6.

FIG. 2 illustrates one embodiment of the torque limiter connection between each pair of chains 2 and the corresponding end of shaft 4.

This end of shaft 4 is shown at 11 in FIG. 2. End 11 is splined and receives three friction clutch disks, respectively 12, 13 and 14.

The central bore of the disks is splined so that once fitted on the end 11, disks 12, 13 and 14 are locked for rotation with the shaft of the rotor, in both directions.

Between disks 12, 13 and 14 are disposed two pinions 3 bearing against shoulders 15 of the disks through a bronze ring 16. The sides of pinions 3 are in contact with the friction surfaces 17 of disks 12 to 14.

Disks 12 to 14 are pressed against each other by screws 18 engaged in smooth bores 19 in the two external disks 13 and 14 and in a tapped bore 20 of the internal disk 12. Screws 18 press a sort of Belleville washer 21 against the external disk 14.

The assembly 3 and 12 to 14 is applied by an external flange not shown against a ball bearing 22 inserted between shaft 11 and the lateral support arms 10 of the rotor.

With a torque wrench, screws 18 can be tightened with a given torque.

The two end torque limiters of shaft 4, 11 are adjusted equally be means of the torque wrench and to a value of about 60 to 70% of the nominal torque it is desired to exert on the rotor.

Thus, at each end of the shaft of the rotor, the drive torques exerted will be automatically balanced, the rotor being driven during its work only from the moment when all the four drive members, namely the four chains 2 and the four pinions 3, drive the rotor in phase.

The setting value for each limiter may of course vary to the extent that each limiter is substantially below the nominal drive torque of the rotor and the sum of the two torque values assigned to the two limiters is substantially greater than said nominal torque.

Instead of two independent chains 2, a double chain may be used.

The number of chains is not limited to two. A single chain may be provided or, on the contrary, a number greater than two.

The advantage of two chains over a single chain resides in the reduction of the pinions and the pitch of the chains, which makes it possible to pass more power while keeping a reasonable dimension for the blade-carrying disks and a good working height.

Whatever the number of chains, the provision in accordance with the invention of torque limiters close to the shaft 4 of the rotor, between the latter and the chain-carrying pinions, substantially increases the useful life of the whole of the transmission. In fact, if the rotor is blocked, it can be seen that the very high resistive torques which result therefrom are not passed on to the chains but are absorbed in passing through the torque limiters. It should be noted in this connection that the chains would be subjected to these forces if the torque limiters were inserted, not downstream of the chains, but upstream, namely between pinions 5 and shafts 6.

Figure 4:
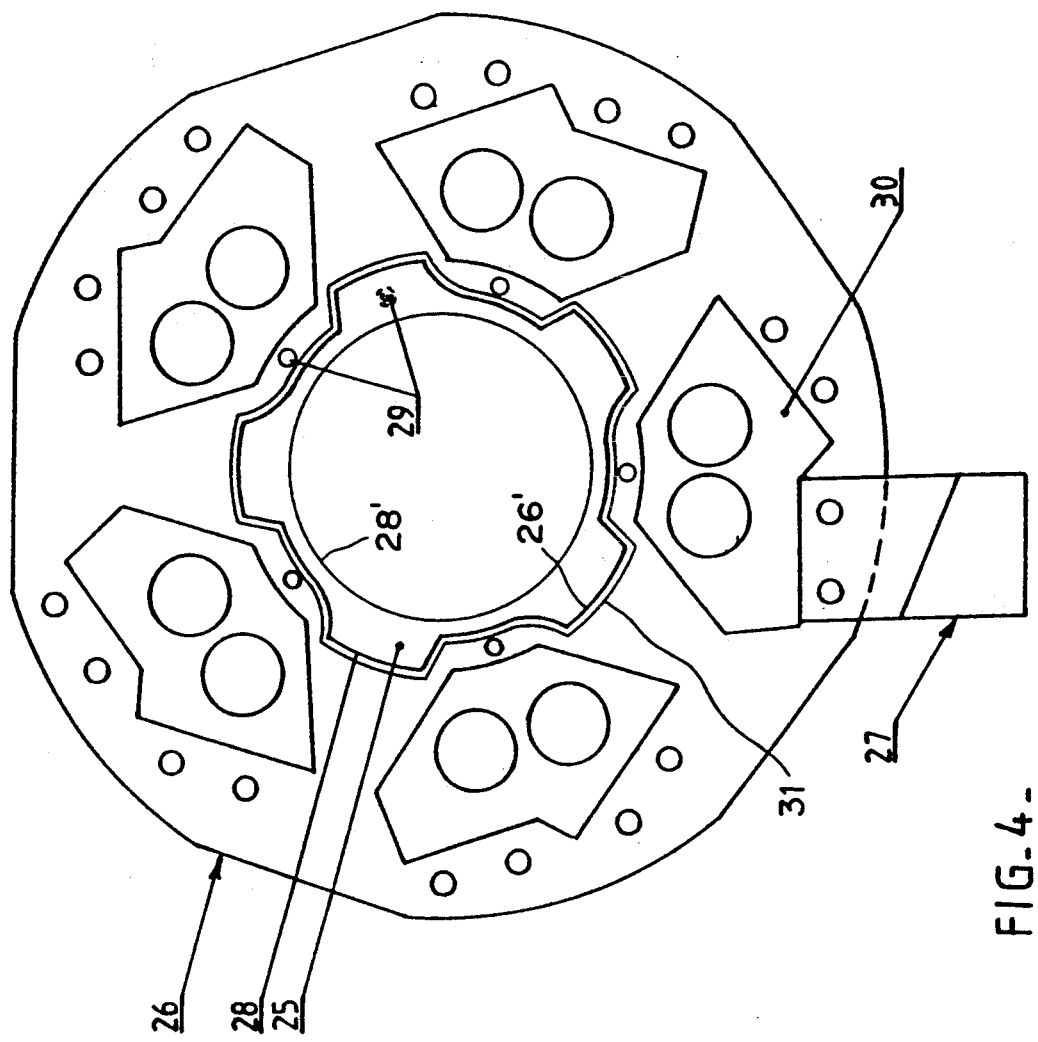
FIG. 4 is a left-hand view of the disk mounted and shown in FIG. 3.
Figure 3:
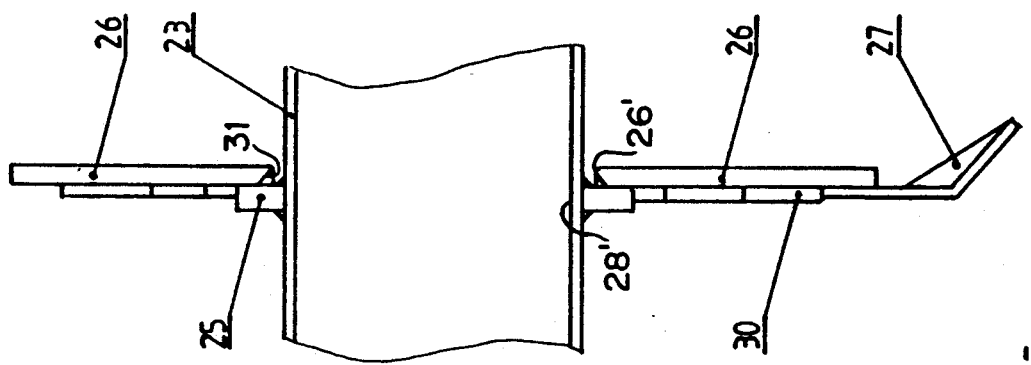
FIG. 3 is an axial sectional view of an intermediate portion of the rotor.

The shaft of the rotor shown in FIGS. 2 to 4 is formed of a tube 23 welded at the ends to a flange 24 and having welded collars 25 spaced apart over the whole of its length.

Collars 25 are formed form cut-outs of disks 26 in the following way. Each disk 26 (FIG. 4) has an internal initial diameter 28' slightly greater than the external diameter of tube 23 as shown in FIG. 3. Each disk 26 is cut as shown in FIG. 4 to obtain internal periphery 26' and complementary collar 25 (in FIG. 4) with external indented contour 28. Thus, collar 25 is formed from the material removed from the center of disk 26. The internal periphery 26' of the disk 26 then has a complementary contour of the external contour 28 of collar 25 with matching indents and projections.

Thus, each disk 26 may be fitted on tube 23 and passed over each welded collar 25, by presenting the disk in an angular position which allows the indents of internal diameter 26' and projections of external contour 28 to align.

To facilitate the passage and also so that each disk is always presented on the same side, internal indented periphery 26' of the disks has chamfered edge 31 on the side which is to be presented on the end of tube 23. Engagement of the disk on the right side is thus infinitely easier.

Disk 26 is fitted on the chosen collar 25 by rotating the disk so that the projecting portions of the indented contours 28 of the collar and of the disk face each other. These projecting portions have holes 29 for engaging fixing screws.

Blades 27 are fixed by screws on one of the faces of disk 26 and are immobilized by two plates 30 welded to the disk and each defining two blade positions.

Such a device for mounting the disks makes it possible to adapt the rotor very rapidly and economically to different kinds of work by using at will only a certain number of collars 25 of disks 26 so as to obtain for example a given working width.

Finally, the invention is obviously not limited to the embodiment shown and described above but covers on the contrary all variants thereof, particularly in so far as the nature and arrangement of the torque limiters at the ends of the rotor shaft are concerned, as well as the structure of the latter and its means for removably fitting working disks and particularly the form of the indented contour 28 of the cut-out formed in each disk 26.

I claim:

1. A rotary soil agitator with automatic distribution of drive torque, comprising:

a rotor with two ends, carrying ground breaking apparatus, each of said ends having at least one pinion coaxially coupled to said rotor;

chain means for transmitting power to said rotor, said chain means being coupled to each of said at least one pinions; and a torque limiter on each of said ends of said rotor interposed between said rotor and a respective one of said at least one pinions, each of said torque limiters being set to substantially equal torque limit values, the sum of the torque limit values being slightly greater than a nominal drive torque of said rotor, said torque limiters including friction disks coupled adjacent opposite sides of each of said pinions.

2. A rotary soil agitator in accordance with claim 1, wherein said chain means includes two independent chains at each said end of said rotor; and each said end of said rotor has two pinions coupled thereto.

3. A rotary soil agitator with automatic distribution of drive torque, comprising:

a shaft with two ends and spaced radial collars secured to said shaft, each of said ends having at least one pinion coaxially coupled to said shaft, each of said collars having an external periphery with spaced projecting portions;

ground breaking apparatus carried by said shaft including blade carrying disks removably secured to said spaced collars, each of said blade carrying disks having an internal cut-out with spaced indents, said internal cut-out being complementarily in size and shape to said external periphery, each of said internal cut-outs having a chamfered edge;

chain means for transmitting power to said shaft, said chain means being coupled to each of said at least one pinions; and a torque limiter on each of said ends of said shaft interposed between said shaft and a respective one of said at least one pinions, each of said torque limiters being set to substantially equal torque limit values, the sum of the torque limit values being slightly greater than a nominal drive torque of said shaft.

4. A rotary soil agitator in accordance with claim 1, wherein each of said torque limiters comprises adjustable means coupled to one of said friction disks on each said end of said rotor.

5. A rotary soil agitator in accordance with claim 1, wherein each of said friction disks has at least one bore therethrough, each of said at least one bores in said friction disks on each said end of said rotor being aligned.

6. A rotary soil agitator in accordance with claim 5, wherein one of said at least one bores on each end of said rotor is internally threaded; and each of said adjustable means is received in said at least one bores and secured to said internally threaded bore on each said end of said rotor.

7. A rotary soil agitator in accordance with claim 1, wherein each said adjustable means includes an adjustable screw.

8. A rotary soil agitator in accordance with claim 1, wherein
    said rotor is a shaft having spaced radial collars secured thereto; and
    said spaced radial collars have blade carrying disks removably secured thereto.

9. A rotary soil agitator in accordance with claim 8, wherein
    each of said blade carrying disks has an internal cut-out with spaced indents.

10. A rotary soil agitator in accordance with claim 8, wherein
    each of said collars has an external periphery with spaced projecting portions.

11. A rotary soil agitator in accordance with claim 10, wherein
    each of said blade carrying disks has an internal cut-out with spaced indents; and
    said internal cut-out is complementarily in size and shape to said external periphery.

12. A rotary soil agitator in accordance with claim 11, wherein
    each of said internal cut-outs has a chamfered edge.

* * * * *